United States Patent [19]

Ko et al.

[11] Patent Number: 5,369,192
[45] Date of Patent: Nov. 29, 1994

[54] BINDER RESIN FOR RESIN TRANSFER MOLDING PREFORMS

[75] Inventors: Chan U. Ko, Woodbury; Steven C. Hackett, St. Paul, both of Minn.

[73] Assignee: Minnesota Mining and Manufacturing Company, St. Paul, Minn.

[21] Appl. No.: 83,400

[22] Filed: Jun. 28, 1993

[51] Int. Cl.$^5$ ............................................. C08G 59/50
[52] U.S. Cl. ..................................... 525/484; 528/27; 528/97; 525/482; 525/524
[58] Field of Search ............... 525/524, 482, 484; 528/97, 27

[56] References Cited

U.S. PATENT DOCUMENTS

| | | | |
|---|---|---|---|
| 4,639,387 | 1/1987 | Epel | 428/113 |
| 4,684,678 | 8/1987 | Schultz et al. | 523/466 |
| 4,707,534 | 11/1987 | Schultz | 528/97 |
| 4,769,399 | 9/1988 | Schenz | 523/213 |
| 4,786,668 | 11/1988 | Dewhirst | 523/445 |
| 4,786,669 | 11/1988 | Dewhirst | 523/445 |
| 4,882,370 | 11/1989 | Jordan et al. | 523/215 |
| 4,882,464 | 11/1989 | Obara | 219/69.13 |
| 4,980,234 | 12/1990 | Almer et al. | 428/414 |
| 4,983,672 | 1/1991 | Almer et al. | 525/65 |
| 4,988,469 | 1/1991 | Reavely et al. | 264/113 |
| 4,992,228 | 2/1991 | Heck et al. | 264/135 |
| 5,071,711 | 12/1991 | Heck et al. | 428/542.8 |
| 5,183,972 | 2/1993 | Duane et al. | 174/251 |

FOREIGN PATENT DOCUMENTS 63-218725  9/1988  Japan .
2225277A   5/1990  United Kingdom .
226159     9/1968  U.S.S.R. .

OTHER PUBLICATIONS

*Advances in Binders for RTM and SRIM Fiber Preforming*, Advanced Composite Materials: New Developments and Applications Conference Proceedings, Dertoit, Michigan USA, Sep. 30–Oct. 3, 1991, pp. 41–47.
*Low Flammability Epoxy Polymers Via 9,9–Bis(4,-4′–Aminophenyl)Fluorene*, A project Presented to the Department of Chemistry San Jose State University, Jeffrey G. Holloway, Aug. 1984.
PR 500 Epoxy Resin, Issue No. 2, Apr. 1, 1990.
SP 500–2 Carbon Epoxy Prepreg, Issue No. 3, Jun. 1, 1990.

*Primary Examiner*—Frederick Krass
*Attorney, Agent, or Firm*—Gary L. Griswold; Walter N. Kirn; Steven E. Skolnick

[57] ABSTRACT

The invention relates to a resin transfer molding preform binder resin that comprises at least one aromatic polyepoxide, a fluorene epoxide that is different than the aromatic polyepoxide and having a defined structure, and a 9,9-bis(aminophenyl)fluorene curing agent. The binder resin is a solid, room temperature stable, essentially nonsintering powder that displays a glass transition temperature greater than about 40° C. Also disclosed are preforms made with the binder resin and a method for preparing the preforms.

16 Claims, No Drawings

BINDER RESIN FOR RESIN TRANSFER MOLDING PREFORMS

BACKGROUND OF THE INVENTION

1. Field of the Invention

This invention relates generally to binder resins for resin transfer molding preforms and, more particularly, to powdered binder resins that are highly compatible with the subsequently injected matrix resin. This invention also relates to preforms assembled with the powdered binder resins and a method for preparing such preforms.

2. Description of the Related Art

Resin transfer molding (RTM) is a process used to fabricate fiber-reinforced composite articles. The process involves two basic procedures: fabricating a fiber preform in the shape of the finished article and impregnating the preform with a thermosetting resin, commonly called the matrix resin. The resulting fiber-reinforced composite article displays high strength and low weight. Such articles are used in the aerospace industry and for other applications requiring low weight, high strength materials.

The first procedure in the RTM process is to fabricate the fiber preform in the shape of the desired article. The preform generally comprises a plurality of fabric layers or plies that impart the desired reinforcing properties to the ultimate composite. As an example, the fabric plies may comprise graphite, aramid or glass fibers. Generally, the techniques used to form the preform are borrowed from the garment industry. For example, the fabric plies may be cut according to a predetermined pattern, loosely bonded or stabilized so that the plies maintain the desired shape, and laid up on a mandrel or placed in a mold having the desired shape.

Once the fiber preform has been fabricated, it is placed in a closed cavity mold for the second procedure in the RTM process. The mold is closed and the matrix resin (typically an epoxy) is injected under pressure to initially wet and eventually impregnate the preform. The matrix resin initially has a very low viscosity to enable it to thoroughly impregnate the preform. The temperature of the mold is then set to the cure temperature of the matrix resin, thereby causing the resin to increase in viscosity and, ultimately, to solidify. A finished fiber-reinforced composite article typically comprises between approximately 50 volume % and 65 volume % fibers.

One of the bottlenecks in the RTM process is stabilizing the preform prior to placing it in the closed cavity mold. Stabilization is necessary to ensure that the fabric plies maintain the desired shape and orientation until they are impregnated with the matrix resin. Stabilization also prevents the fabric plies from unraveling along cut edges. Common methods used to stabilize the preform include stitching, adhesively bonding the fabric plies with a nonreactive solid or viscous liquid binder resin, and hot iron tacking. These methods are both labor and time intensive.

Stitching can be a very effective means of stabilizing the preform; however, stitching is difficult to perform after the fabric plies have been laid up on a mandrel or placed in a mold. Moreover, stitching is not conducive to fabricating a preform having a complex shape because stitching tends to make the fabric plies too rigid to bend easily.

Adhesively bonding the fabric plies with a binder resin is a promising approach. However, some currently employed binder resins may adversely affect the mechanical properties of the subsequent composite article. For example, if the binder resin is not highly compatible with the matrix resin, the ultimate composite may display a reduced glass transition temperature and/or a broadened glass transition temperature as well as changes in tensile modulus and moisture absorption.

Hot iron tacking is more amenable to fabricating preforms that have a complex shape than are other methods. However, it may be more labor intensive and time consuming if the preform includes many plies. In one approach, a thermoplastic polymer is disposed between each fabric ply and is melted with a hot iron. The polymer is allowed to resolidify, thereby bonding adjacent plies together. Tacking must be done one ply at a time because heat transfer is by conduction only. (Many reinforcing fabrics are poor heat conductors.)

Consequently, it would be desirable to have a method for assembling resin transfer molding preforms that did not involve stitching, a reduction in the mechanical properties of the ultimate composite article, or hot iron tacking.

U.S. Pat. No. 4,992,228, "Method for Preparing Preforms for Molding Processes," issued Feb. 12, 1991, to H. G. Heck et al. and U.S. Pat. No. 5,071,711, "Preforms for Molding Processes," issued Dec. 10, 1991, also to H. G. Heck et al. disclose resin transfer molding preforms and a method for preparing the same. The preforms are prepared by melting a solid, nonsintering, thermoplastic-like resinous compound on the surface of a substrate material. Once the resinous compound has been cooled, one or more plies of the coated substrate material are assembled into the desired shape, heated to a temperature above the melting temperature of the resinous compound, and then cooled to a temperature below the melting point of the resinous compound so as to provide a preshaped preform for use in resin transfer molding. The thermoplastic-like resinous compound can be melted or solidified at will by raising or lowering the temperature of the substrate and is substantially free of any compound that would serve as a crosslinker therefore.

U.S. Pat. No. 4,988,469, "Method of Fabricating Fiber Reinforced Composite Articles by Resin Transfer Molding," issued Jan. 29, 1991 to R. T. Reavely also discloses a multistep process. A plurality of dry fabric plies are stacked, formed into the desired shape, and stabilized so as to provide a dry fiber preform. The preform is placed in a resin transfer mold and injected under pressure with a thermosetting resin that impregnates the stabilized fiber preform. The preform is stabilized by disposing a polymeric binder between adjacent fabric plies and melting the binder by directing a stream of heated air through the fabric plies so as to bind them together.

U.S. Pat. No. 4,684,678, "Epoxy Resin Curing Agent, Process, and Composition," issued May 30, 1985 to W. J. Schultz et al. discloses an epoxy resin composition comprising at least one aromatic polyepoxide and at least one 9,9-bis(aminophenyl)fluorene curing agent. The compositions are reportedly useful for impregnating woven and nonwoven webs for composite articles.

SUMMARY OF THE INVENTION

This invention relates to a binder resin that is an essentially nonsintering, room temperature stable, solid powder. The binder resin is useful for adhesively bonding together the adjacent fabric plies of a resin transfer molding preform. The uncured binder resin displays a glass transition temperature of greater than 40° C., more preferably greater than 55° C., and most preferably greater than 65° C., along with a minimum viscosity (as measured by dynamic mechanical analysis) of less than about 100,000 poise, more preferably less than about 10,000 poise, and most preferably less than about 1,000 poise.

The powdered binder resin of the invention comprises, and more preferably consists essentially of, at least one aromatic polyepoxide, a fluorene-containing epoxide having a defined structure and which is different than the aromatic epoxide, and a 9,9-bis(aminophenyl)fluorene curing agent that enables the binder resin of the invention to cure (i.e., crosslink) to form a thermoset compound. Advantageously, the powdered binder resin of the invention can be provided by melt extruding a dry blend of these ingredients without advancing (i.e., partially curing or B-staging) them before further use.

Preferably the aromatic polyepoxide is a polyglycidyl ether of a polyhydric phenol. More preferably, the aromatic polyepoxide is provided by a blend of a diglycidly ether of bisphenol A and an epoxy cresol novolac. Preferably, the fluorene epoxide is a diglycidyl ether of a 9,9-bis(hydroxyphenyl)fluorene; more preferably, it is 9,9-bis[4-(2,3-epoxypropoxy)phenyl]fluorene.

Preferably, the 9,9-bis(aminophenyl)fluorene curing agent has the following general structure:

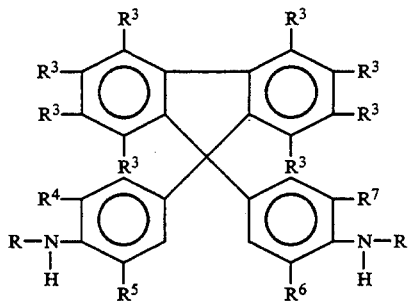

In this structure, each R is independently selected from hydrogen and linear and branched alkyl groups having 1 to 6 carbon atoms. More preferably, however, R is either hydrogen or at least 25 mole % of the R moieties are provided by linear or branched alkyl groups having 1 to 6 carbon atoms. Each $R^3$ is independently selected from hydrogen, the halogens, aromatic groups, nitro groups, acetyl groups, trimethylsilyl groups, and linear and branched alkyl groups having 1 to 6 carbon atoms. Each $R^4$, $R^5$, $R^6$ and $R^7$ is preferably independently selected from hydrogen, the halogens, aromatic groups, and linear and branched alkyl groups having 1 to 6 carbon atoms. More preferred are curing agents in which at least one of the $R^4$ and $R^5$ moieties is a halogen, an aromatic group, or a linear or branched alkyl group having 1 to 6 carbon atoms, and at least one of the $R^6$ and $R^7$ moieties is similarly selected.

Thus, certain preferred binder resins comprise a polyglycidyl ether of a polyhydric phenol, a diglycidyl ether of a 9,9-bis(hydroxyphenyl)fluorene, a 9,9-bis-(aminophenyl)fluorene curing agent in which at least 25 mole % of the R moieties are provided by linear or branched alkyl groups having 1 to 6 carbon atoms, and an optional second epoxy resin curing agent (e.g., an aliphatic polyamine, an aromatic polyamine, an aromatic polyamide, an alicyclic polyamine, or an amino resin). The binder resin comprises from 0.5 to 1.1 —NHR groups, per epoxide group present in the polyglycidyl ether of the polyhydric phenol and the diglycidyl ether of the 9,9-bis(hydroxyphenyl)fluorene, 20 to 100 mole % of the —NHR groups being provided by the 9,9-bis(aminophenyl)fluorene curing agent and 80 to 0 mole % of the —NHR groups being provided by the optional second epoxy resin curing agent.

Even more preferred are binder resins that comprise a polyglycidyl ether of a polyhydric phenol, a diglycidyl ether of a 9,9-bis(hydroxyphenyl)fluorene, and a 9,9-bis(aminophenyl)fluorene curing agent in which R is hydrogen and $R^3$ is as defined above. At least one of the $R^4$ and $R^5$ moieties is a halogen, an aromatic group, or a linear or branched alkyl group having 1 to 6 carbon atoms, and at least one of the $R^6$ and $R^7$ moieties is similarly selected. In these binder resins, the curing agent provides from 0.6 to 0.85 —$NH_2$ groups, per epoxide group provided by the polyglycidyl ether of the polyhydric phenol and the diglycidyl ether of the hydroxyphenylfluorene.

Resin transfer molding preforms made with the binder resins of the invention comprise a plurality of fabric plies having the binder resin fused thereto. The binder resin adhesively bonds the plies together so that they maintain their shape until placed in the mold for injection of the preform-impregnating matrix resin. The binder resin comprises about 2 to 12% by weight, based on the weight of the fabric plies, more preferably about 3 to 8% by weight, and most preferably about 4 to 6% by weight. However, only an amount sufficient to stabilize the preform need be used.

The preform may be made by providing a binder resin according to the invention, applying the binder resin to a plurality of fabric plies (for example, with a gravity stream or by electrostatic powder deposition), heating the fabric plies and binder resin to melt the binder resin, cooling the fabric plies and melted binder resin to solidify the binder resin and fuse it to the fabric plies, arranging the fabric plies in layers, heating the arrangement of fabric plies to melt the binder resin, and cooling the fabric plies and melted binder resin to solidify the binder resin so that it adhesively bonds the fabric plies together.

The powdered binder resins of the invention are uniquely compatible with a particular class of matrix resins that are used to impregnate the preform. That is, in a composition containing only matrix resin, the binder resin may selectively replace the matrix resin in an amount equal to at least 50% by weight of the matrix resin, more preferably at least 75% by weight, and most preferably 100% by weight, without a change in the performance of the blend as compared to the neat matrix resin. A suitable matrix resin comprises a diglycidyl ether of bisphenol A, a diglycidyl ether of bisphenol F (alternatively, a triglycidyl ether of a para-amino phenol), a diglycidyl ether of a 9,9-bis(hydroxyphenyl)fluorene, and a 9,9-bis(aminophenyl)fluorene curing agent.

DETAILED DESCRIPTION OF THE PREFERRED EMBODIMENTS

This invention relates to a binder resin that is an essentially nonsintering, room temperature (i.e., about 20° to 22° C.) stable, solid powder. As used herein, "binder resin" refers to a material that adhesively bonds together adjacent fabric fibers or plies by fusing to the surface thereof, such as in a resin transfer molding preform. The "binder resin" is to be distinguished from the thermosetting matrix resin that is subsequently injected into and impregnates the preform so as to provide a fiber-reinforced, light weight, high strength composite article. This invention also relates to preforms assembled with the binder resins of the invention, as well as a method for preparing such preforms.

By "essentially nonsintering" it is meant that the powder particles usefully resist a tendency to agglomerate that would otherwise prevent the powder from being readily applied to a fabric using conventional techniques (such as are described below). Consequently, the binder resin typically displays an average powder particle size of less than about 500 microns (μm), preferably between about 20 and 500 μm, more preferably between about 30 and 200 μm, and most preferably between about 40 and 80 μm. Some agglomeration of the powder particles may occur so long as the average particle size of the agglomerate does not preclude ready application of the powder using known techniques. As a result, the average powder particle size of the agglomerate does not fall outside the desired particle size ranges.

By "room temperature stable" is meant a material that remains an essentially nonsintering, solid powder after six months at room temperature.

Powdered binder resins according to the invention display a glass transition temperature (as measured by differential scanning calorimetry) of greater than 40° C., more preferably greater than 55° C., and most preferably greater than 65° C. (when the binder resin is uncured), along with a minimum viscosity as measured by dynamic mechanical thermal analysis of less than about 100,000 poise, more preferably less than about 10,000 poise, and most preferably less than about 1,000 poise.

Importantly, the powdered binder resins of the invention are uniquely compatible with a particular class of matrix resins. By "compatible" it is meant that given a composition containing 100% (i.e., neat) matrix resin, the binder resin may selectively replace the matrix resin in an amount equal to at least 50% by weight of the matrix resin, more preferably at least 75% by weight, and most preferably 100% by weight of the matrix resin, without a change in performance as compared to the neat matrix resin. By "without a change in performance," it is meant that, when comparing the binder resin/matrix resin blend to the neat matrix resin, the glass transition temperature (as measured in °K.) does not change by more than 2%, the tensile modulus does not change by more than 5%, and the moisture absorption percentage does not change by more than 25%, based on the analytical methods described more fully hereinbelow. Thus, it will be understood that the binder resins of the invention are highly compatible with the matrix resin and, in the most preferred case, can be blended with the matrix resin in any amount without changing the performance of the matrix resin.

The powdered binder resins of the invention comprise, and more preferably consist essentially of, at least one aromatic polyepoxide, a fluorene-containing epoxide that is different than the aromatic epoxide, and a 9,9-bis(aminophenyl)fluorene curing agent that enables the binder resins of the invention to cure (i.e., crosslink) to form a thermoset polymer. Thus, the powdered binder resins of the invention are thermosetting rather than thermoplastic. The binder resin ingredients are preferably solid materials at room temperature, although blends of liquid and solid materials may be used so long as the resulting binder resin is a room temperature solid in order to facilitate its provision in powder form.

Aromatic polyepoxides required in the binder resins of the invention comprise more than one glycidyl group, i.e.,

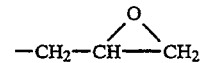

attached directly or indirectly to an aromatic nucleus such as a benzene, diphenyl, diphenyl methane, diphenyl propane or a napthanol structure. The aromatic polyepoxides are preferably the polyglycidyl ethers of polyhydric phenols, glycidyl esters of aromatic carboxylic acids, N-glycidylamino-benzenes, and glycidylamino-glycidoxy-benzenes. Most preferably the aromatic polyepoxides are the polyglycidyl ethers of polyhydric phenols. However, the most preferred aromatic polyepoxides are the diglycidyl ethers of bisphenol A having an epoxide equivalent weight of about 500 to 750, preferably of about 525 to 550, and epoxy novolac resins having an epoxide equivalent weight of about 170 to 250. Blends of different materials may be used.

Examples of other aromatic polyepoxides useful in the binder resins of the invention include the polyglycidyl derivatives of polyhydric phenols such as 2,2-bis-[4-(2,3-epoxypropoxy)phenyl]propane. A preferred class of polyglycidyl ethers of polyhydric phenols are the diglycidyl ethers of bisphenol that have pendent carbocyclic groups. Examples of such diglycidyl ethers are 2,2-bis[4-(2,3-epoxypropoxy)phenyl]norcamphane and 2,2-bis[4-(2,3-epoxypropoxy)phenyl]decahydro-1,4,5,8-dimethanonaphthalene.

Examples of N-glycidylaminobenzenes suitable for use as the aromatic polyepoxides include the di- and polyglycidyl derivatives of benzenamine, benzene diamines, naphthylenamine and naphthylene diamine such as N,N-diglycidylbenzenamine, N,N-diglycidylnaphthalenamine, 1,4-bis(N-glycidylamino)benzene, 1,3-bis(N,N-diglycidylamino)benzene, and 1,4-bis(N,N-diglycidylamino)benzene. An example of a polyglycidyl derivative of aromatic aminophenol is N,N-diglycidyl-4-glycidoxybenzenamine (MY 0510, Ciba Geigy, Inc.)

Examples of further suitable aromatic polyepoxides are disclosed in U.S. Pat. Nos. 3,018,262, 3,298,998 and 2,951,825.

The fluorene-containing epoxide (or fluorene epoxide as sometimes used herein) includes materials having the following general formula I:

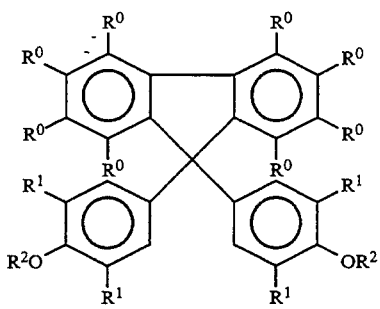

Each R $^{and\ R^1}$ is independently selected from hydrogen and other groups substantially inert to the polymerization of epoxide group-containing compounds. R is preferably independently selected from hydrogen, the halogens (F, Cl, Br and I), linear and branched alkyl groups having 1 to 6 carbon atoms, aromatic groups, nitro groups, acetyl groups, and trimethylsilyl groups. Each $R^1$ is preferably independently selected from hydrogen, aromatic groups, the halogens, and linear and branched alkyl groups having 1 to 6 carbon atoms.

$R^2$ is an epoxy-functionalized alkyl group capable of reacting through the epoxy group to form epoxy resins. Preferably each $R^2$ is, independently, a terminal epoxy-functionalized alkyl group having 1 to 6 carbon atoms. Most preferably each $R^2$ is a 2,3-epoxypropyl group.

By "independently selected" it is meant that there is no requirement that each R be the same, or that each $R^1$ be the same, or that each $R^2$ be the same. ("Independently selected" is used similarly throughout.) A mixture of different materials may be used as the fluorene epoxide.

Preferably, the fluorene epoxide is a diglycidyl ether of bis(hydroxyphenyl)fluorene. More preferably, it is the diglycidyl ether of a 9,9-bis(hydroxyphenyl)fluorene. Most preferably, it is 9,9-bis[4-(2,3-epoxypropoxy)phenyl] fluorene:

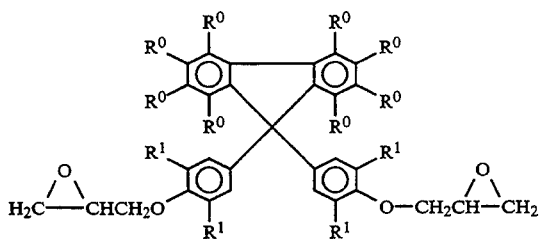

where $R^0$ and $R^1$ are hydrogen.

The curing agent comprises at least one 9,9-bis-(aminophenyl)fluorene, the phenyl and benzo groups of which can be unsubstituted or substituted by one or more atoms or groups that are inert to reaction with an epoxide group. Preferably, the aminofluorene curing agent has the general formula III:

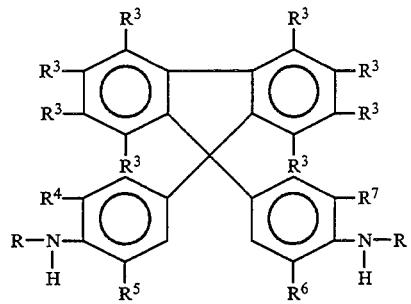

Each $R^3$ is independently selected from hydrogen and groups that are inert to the polymerization of epoxide group-containing compounds. Preferably $R^3$ is a halogen, a linear or branched alkyl group having 1 to 6 carbon atoms, an aromatic group, a nitro group, an acetyl group, or a trimethylsilyl group. Each R is independently selected from hydrogen and linear and branched alkyl groups having 1 to 6 carbon atoms. Each $R^4$, $R^5$, $R^6$ and $R^7$ is independently selected from hydrogen, aromatic groups, the halogens, and linear and branched alkyl groups having 1 to 6 carbon atoms.

Examples of curing agents that satisfy the general formula III are:
9,9-bis(4-aminophenyl)fluorene,
4-methyl-9,9-bis(4-aminophenyl)fluorene,
4-chloro-9,9-bis(4-aminophenyl)fluorene,
2-ethyl-9,9-bis(4-aminophenyl)fluorene,
2-iodo-9,9-bis(4-aminophenyl)fluorene,
3-bromo-9,9-bis(4-aminophenyl)fluorene,
9-(4-methylaminophenyl)-9-(4-ethylaminophenyl)-fluorene,
1-chloro-9,9-bis(4-aminophenyl)fluorene,
2-methyl-9,9-bis(4-aminophenyl)fluorene,
2,6-dimethyl-9,9-bis(4-aminophenyl)fluorene,
1,5-dimethyl-9,9-bis(4-aminophenyl)fluorene,
2-fluoro-9,9-bis(4-aminophenyl)fluorene,
1,2,3,4,5,6,7,8-octafluoro-9,9-bis(4-aminophenyl)fluorene,
2,7-dinitro-9,9-bis(4-aminophenyl)fluorene,
2-chloro-4-methyl-9,9-bis(4-aminophenyl)fluorene,
2,7-dichloro-9,9-bis(4-aminophenyl)fluorene,
2-acetyl-9,9-bis(4-aminophenyl)fluorene,
2-methyl-9,9-bis(4-methylaminophenyl)fluorene,
2-chloro-9,9-bis(4-ethylaminophenyl)fluorene, and
2-t-butyl-9,9-bis(4-methylaminophenyl)fluorene.

In more preferred aminofluorene curing agents, $R^3$, $R^4$, $R^5$, $R^6$ and $R^7$ are all as defined above with respect to formula III, and R is independently selected from hydrogen and linear and branched alkyl groups having 1 to 6 carbon atoms, provided that at least 25 mole % of the R moieties are the linear or branched alkyl groups. Examples of such "more preferred" curing agents include:
9,9-bis(4-methylaminophenyl)fluorene,
9-(4-methylaminophenyl)-9-(4-aminophenyl)fluorene,
9,9-bis(4-ethylaminophenyl)fluorene,
9-(4-ethylaminophenyl)-9-(4-aminophenyl)fluorene,
9,9-bis(4-propylaminophenyl)fluorene,
9,9-bis(4-isopropylaminophenyl) fluorene,
9,9-bis(4-butylaminophenyl) fluorene,
9,9-bis ( 3-methyl-4-methylaminophenyl)fluorene,
9,9-bis(3-chloro-4-methylaminophenyl)fluorene, 9-(4-methylaminophenyl)-9-(4-ethylaminophenyl)-fluorene,
9,9-bis(3,5-dimethyl-4-methylaminophenyl)fluorene,
9-(3,5-dimethyl-4-methylaminophenyl)-9-(3,5-dimethyl-4-aminophenyl)fluorene,
1,5-dimethyl-9,9-bis(3,5-dimethyl-4-methylaminophenyl)fluorene,
4-methyl-9,9-bis(4-methylaminophenyl)fluorene, and
4-chloro-9,9-bis(4-methylaminophenyl)fluorene.

In the most preferred aminofluorene curing agents, $R^3$ is as defined above in formula III, R is hydrogen, and $R^4$, $R^5$, $R^6$ and $R^7$ are independently selected from hydrogen, the halogens, aromatic groups, and linear and branched alkyl groups having 1 to 6 carbon atoms but with the further provisos that at least one of the $R^4$ and $R^5$ moieties and at least one of $R^6$ and $R^7$ moieties is a linear or branched alkyl group having 1 to 6 carbon atoms, a halogen, or an aromatic group.

Examples of the "most preferred" curing agents include:
9,9-bis(3-methyl-4-aminophenyl)fluorene,
9,9-bis(3-ethyl-4-aminophenyl)fluorene,
9,9-bis(3-phenyl-4-aminophenyl)fluorene,
9,9-bis(3,5-dimethyl-4-aminophenyl)fluorene,
9-bis(3,5-diethyl-4-aminophenyl)-9-(3-methyl-4-aminophenyl)fluorene,
9,9-bis(3,5-diisopropyl-4-aminophenyl)fluorene,
9,9-bis(3-chloro-4-aminophenyl)fluorene,
9,9-bis(3,5-dichloro-4-aminophenyl)fluorene, and
9,9-bis(3,5-diethyl-4-methylaminophenyl)fluorene.

The aminofluorene curing agent is present in an amount sufficient to provide from 0.1 to 1.1 amino groups (i.e. —NHR groups where R is hydrogen or a linear or branched alkyl group having 1 to 6 carbon atoms, as defined above in formula III) per epoxide group as provided by the aromatic polyepoxide and the fluorene epoxide components.

The aminofluorene curing agent can be supplemented with conventional epoxy resin curing agents. Included among such supplementary curing agents are aliphatic and aromatic primary and secondary amines for example, di(4-aminophenyl)sulfone, di(4-aminophenyl)ether, and 2,2-bis(4-aminophenyl)propane; aliphatic and aromatic tertiary amines such as dimethylaminopropylamine and pyridine; boron trifluoride complexes such as $BF_3$-diethylether and $BF_3$-monoethanolamine; imidazoles such as 2-ethyl-4-methylimidazole; hydrazides such as adipodihydrazide; guanidines such as tetramethyl guanidine; and dicyandiamide.

Also useful as supplementary curing agents are Lewis acids such as aluminum chloride, aluminum bromide, boron trifluoride, antimony pentafluoride, phosphorous pentafluoride, titanium tetrafluoride and the like. It is also desirable at times that these Lewis acids be blocked to increase the latency of compositions containing them. Representative of blocked Lewis acids are $BF_3$-monoethylamine and adducts of $HSbF_5X$ with either aniline-functional materials or a hindered amine, X being OH, halogen, or $OR^8$ ($R^8$ is an aliphatic or an aromatic group).

Various adjuvants can also be added to the powdered binder resins of the invention. Included among useful adjuvants are flow control agents such as fumed silica; pigments to enhance color tones such as ferric oxide, brick dust, carbon black, and titanium oxide; fillers such as silica, magnesium sulfate, calcium sulfate, and beryllium aluminum silicate; clays such as bentonite; and glass beads and bubbles. Amounts of up to about 200 parts of adjuvant per 100 parts of binder resin composition can be used.

A preferred binder resin according to the invention comprises:
(1) at least one aromatic polyepoxide, which preferably is at least one polyglycidyl ether of a polyhydric phenol;
(2) a fluorene epoxide, which preferably is a diglycidyl ether of bis(hydroxyphenyl)fluorene; and
(3) 0.5 to 1.1 —NHR groups, per epoxide group present in the aromatic polyepoxide and the fluorene epoxide, of an amino group-containing epoxy resin curing agent or a mixture of amino group-containing epoxy resin curing agents of which
(a) 20 to 100 mole % of the —NHR groups is provided by a 9,9-bis(aminophenyl)fluorene having the structure of the "more preferred" aminofluorene curing agents described above, and
(b) 80 to 0 mole % of the —NHR groups is provided by a second epoxy resin curing agent preferably selected from aliphatic polyamines, aromatic polyamines, aromatic polyamides, alicyclic polyamines, polyamines, polyamides, and amino resins. (Most preferably, the second epoxy resin curing agent is a 9,9-bis(4-aminophenyl)fluorene.)

However, the most preferred binder resin compositions of the invention comprise:
(1) one or more aromatic polyepoxides provided as polyglycidyl ethers of polyhydric phenols;
(2) a fluorene epoxide provided as a diglycidyl ether of a bis(hydroxyphenyl)fluorene; and
(3) 0.6 to 0.85 —$NH_2$ groups, per epoxide group provided by the aromatic polyepoxide and the fluorene epoxide, wherein the —$NH_2$ groups are supplied by the "most preferred" aminofluorene curing agents described above.

As noted above, the powdered binder resins of the invention are especially useful for adhering together the adjacent fabric plies in a resin transfer molding preform. The term "fabric" is used broadly to include fibers of various materials such as glass (e.g., E-glass and S-glass), aramid and graphite (carbon). The fabric can be woven or nonwoven fibrous materials, random fibers, multi-strands of monofilaments stitched together in various weaves, and the like. Preferably, the substrate material is a woven or nonwoven fibrous material. The binder resins of the invention are also useful in adhering together the individual fibers of a fiber bundle or tow for making a towpreg.

The powdered binder resins are applied to the surface of the fabric without impregnating it. Advantageously, there is no need to apply the binder resin to the fabric surface in a substantially even manner. Because of the excellent compatibility of the binder resin with certain matrix resins, the two resins, when appropriately selected, readily blend upon subsequent injection of the matrix resin. In the absence of such compatibility, it would be necessary to provide a uniform distribution of the binder resin in the ultimate composite article. An uneven distribution of the binder resin in such composite articles could result in reduced mechanical properties, structural weaknesses or perhaps even failure of the composite article. An even distribution of the binder resin can be difficult to achieve because the binder resin may be displaced or moved when contacted by the incoming, pressurized matrix resin. While the powdered binder resin is typically employed in an amount of from about 2 to 12 percent by weight, based on the weight of the fabric, more preferably about 3 to 8 percent by weight, and most preferably about 4 to 6 percent by weight, the binder resin need only be employed in an amount sufficient to stabilize the preform until it is placed in the closed cavity mold.

One method of applying the powder is by hand. The powder is sprinkled onto the fabric and smoothed over the fabric surface. Excess powder is removed by lifting the fabric, turning it onto its edge, and shaking it several times. Another method of applying the powder is to spread it over the surface of the fabric by means of a gravity fed stream that is supplied from a perforated receptacle. (On a laboratory scale, a salt shaker or a flour sifter-type device could be used.) A third method for distributing the powder onto the fabric layer is electrostatic powder deposition.

Once the binder resin has been applied to the fabric, it is melted onto the fabric surface by heating the powder treated fabric slightly above the melting temperature of the binder resin. Typically, the fabric is heated to about 100° C. Caution should be used to insure that the powdered binder does not melt too quickly and run into interstices of the fabric or impregnate the fabric. This can be prevented by heating the binder resin to not more than about 4° C. above its melting point. Various techniques for heating the powder treated fabric can be used including infrared heat, heated air, convection ovens and the like. Once the binder resin has melted, it is cooled to fuse it to the fabric surface. The fabric plies with the binder resin fused thereto are then assembled into the desired shape by arranging them in layers in a mold or forming them in layers about a mandrel. Once the fabric plies have been so assembled, they are heated to a temperature sufficient to melt the binder resin, thereby adhering the adjacent fabric plies together upon subsequent cooling of the binder resin to below the resin melting temperature. A stabilized resin transfer molding preform results.

The stabilized preform may then be placed in a conventional closed cavity mold for subsequent injection of the matrix resin that impregnates the preform. Because the adjacent fabric plies of the preform have been adhesively bonded together by the powdered binder resin of the invention, the preform readily retains the desired shape when placed in the closed cavity mold.

A particular class of matrix resins are especially well suited for use with the binder resins of the invention because they are highly compatible with the binder resins. That is, neat matrix resin can be selectively replaced by the binder resin in amounts of at least 50% by weight, preferably at least 75% by weight, and most preferably in any amount (i.e., 100% by weight) without a change in the performance of the binder resin/matrix resin blend as compared to the neat matrix resin.

In general, the matrix resins comprise at least one aromatic polyepoxide, a fluorene-containing epoxide, and a 9,9-bis(aminophenyl)fluorene curing agent. Preferably the aromatic polyepoxide is a polyglycidyl ether of a polyhydric phenol, for example, the diglycidyl ethers of biphenols, bisphenols, hydrocarbyl substituted biphenol, hydrocarbyl substituted bisphenols, phenol or hydrocarbyl substituted bisphenol-aldehyde novolac resins, unsaturated hydrocarbon-phenol or hydrocarbyl substituted phenol resins, combinations thereof and the like. Most preferred are the diglycidyl ethers of bisphenol A, the diglycidyl ethers of bisphenol F, and triglycidyl ethers of para-amino phenols.

The fluorene-containing epoxides are similar to the fluorene epoxides described above in conjunction with the powdered binder resins. The diglycidyl ethers of 9,9-bis(hydroxyphenyl)fluorene are preferred. Most preferred is 9,9-bis[4-(2,3-epoxypropoxy)phenyl]fluorene.

In general, the matrix resin curatives are similar to those described above in conjunction with the powdered binder resins. Using formula III above, in the most preferred matrix resin curing agents, $R^3$ is as defined above in formula III, R is hydrogen, and $R^4$, $R^5$, $R^6$ and $R^7$ are independently selected from hydrogen, the halogens, phenyl groups, and linear and branched alkyl groups having 1 to 6 carbon atoms but with the further provisos that at least one of the $R^4$ and $R^5$ moieties and at least one of $R^6$ and $R^7$ moieties is a linear or branched alkyl group having 1 to 6 carbon atoms, a halogen, or a phenyl group.

Examples of the most preferred matrix resin curing agents include:
9,9-bis(3-methyl-4-aminophenyl)fluorene,
9,9-bis(3-ethyl-4-aminophenyl)fluorene,
9,9-bis(3-phenyl-4-aminophenyl)fluorene,
9,9-bis(3,5-dimethyl-4-aminophenyl)fluorene,
9-(3,5-diethyl-4-aminophenyl)-9-(3-methyl-4-aminophenyl)fluorene,
9,9-bis(3,5-diisopropyl-4-aminophenyl)fluorene,
9,9-bis(3-chloro-4-aminophenyl)fluorene,
9,9-bis(3,5-dichloro-4-aminophenyl)fluorene, and
9,9-bis(3,5-diethyl-4-aminophenyl)fluorene.

The binder resin and the matrix resin are chemically similar which facilitates their excellent compatibility. However, it has been discovered that by appropriate selection of the binder resin starting materials, the binder resin can be formulated to have a glass transition temperature of greater than 40° C., more preferably greater than 55° C., and most preferably greater than 65° C. along with a minimum viscosity of less than about 100,000 poise, more preferably less than about 10,000 poise, and most preferably less than about 1,000 poise. With these parameters, the resins can be provided as essentially nonsintering, room temperature stable, solid powders that are uniquely suited for use as resin transfer molding preform binder resins. On the other hand, useful matrix resins typically have a glass transition temperature of less than about 0° C. The matrix resin is formulated with liquid components as compared to primarily solid materials for the binder resin and is typically provided as a high viscosity paste rather than as a solid.

The invention will be more fully appreciated with reference to the following nonlimiting examples.

EXAMPLE 1

A powdered binder resin was prepared by dry blending at room temperature 23.0 parts EPON HPT 1079 (a 9,9-bis[4-(2,3-epoxypropoxy)phenyl]fluorene commercially available from Shell Chemical Company), 26.3 parts ARALDITE ECN 1299 (an epoxy cresol novolac commercially available from Ciba Geigy, Inc.), 16.4 parts EPON 1001 (a diglycidylether of bisphenol A commercially available from Shell Chemical Company), and 34.3 parts 9,9-bis(3-chloro-4-aminophenyl)-fluorene. The dry blend was melt extruded at 180° C. with a twin screw extruder and allowed to air cool to room temperature. By this method, the aminophenyl fluorene curative was melt blended with the other components of the binder resin before converting the binder resin into a powder. Once cooled, the material was ground to a fine powder with a hammer mill that used liquid nitrogen to keep the grinding chamber between about 18° C. and 24° C. The powdered resin was removed from the accumulator and stored in plastic bags at about 27° C.

Advantageously, the binder resin is available for immediate use. There is no need to advance (i.e., partially cure or B-stage) the binder so as to increase its glass transition temperature. As a result, processing of the binder resin is simplified, the cost is reduced, and binder material reproducibility is enhanced.

A typical particle size analysis of the powdered binder resin is shown below in Table 1. This analysis was obtained by sifting the powdered resin through a set of standard sieves and then using a MICROTRAC particle size analyzer charged with 2 to 3 grams of sample. The average particle size, after grinding, was about 20 to 60 μm.

TABLE 1

Particle Size Analysis

| Average Particle Size (microns) | Amount of Material Passing through Seive (Volume %) |
|---|---|
| 180 | 95 |
| 52 | 62 |
| 22 | 30 |
| 8 | 7.8 |

The powdered binder resin displayed a glass transition temperature of about 67° C. and a minimum viscosity of less than 1,000 poise based on the following test procedures.

Uncured Binder Resin Test Procedures

Glass Transition Temperature

The glass transition temperature of the binder resin was determined by differential scanning calorimetry in which a 10 to 20 miligram sample of the powder was scanned from 40° C. to 250° C. at a rate of 40° C./minute. The calorimeter was first calibrated at 156.4° C. using an indium standard, a scan rate of 40° C./minute, and a nitrogen purge. The midpoint of the observed transition is considered to be the glass transition temperature.

Viscosity

Viscosity was measured using a RHEOMETRICS RDA-II Dynamic Mechanical Analyzer in the parallel plate mode of operation. The powdered binder resin was consolidated into a 1 millimeter (mm) thick film by heating a sufficient amount of powder at about 121° C. for no more than 10 minutes. The resulting film was placed between the parallel plates (bottom plate diameter=50 mm; top plate diameter=40 mm). Under a torque with a frequency of 100 radians/second and a strain of 5%, the sample was heated from 50° C. to 177° C. at a rate of 2° C./minute followed by an isothermal hold at 177° C. Viscosity was recorded every minute and reported on a dual y-axis plot (left y-axis=viscosity in centipoise on a log scale) as a function of temperature (right y-axis) and time (x-axis).

EXAMPLES 2 TO 6

In examples 2 to 6, varying amounts of a suitable highly viscous matrix resin paste (3M brand PR500 epoxy resin, commercially available from 3M Company) with a glass transition temperature of less than about 0° C. and a minimum viscosity of about 0.30 poise or less were selectively replaced with the binder resin of example 1 to evaluate their compatibility and to simulate the effect obtained when a composite article is made. In each case a rectangular brick comprising the matrix resin and the binder resin was prepared by curing the blend at 177° C. for about 3 hours. The glass transition temperature and tensile modulus of the cured binder resin/matrix resin blends were then measured, with the results shown below in Table 2. The test procedures are described below.

Compatibility Test Procedures

Glass Transition Temperature (Tg)

The glass transition temperature of the blends was measured by dynamic mechanical analysis employing a RHEOMETRICS RDA-II Dynamic Mechanical Analyzer. A rectangular sample measuring about 1.3 cm by about 5.1 cm by about 0.16 to 0.48 cm thick was cut from the cured brick and placed between the upper and lower grips of the analyzer. The analyzer was provided with an oven that heated the sample from 30° C. to 230° C. in 5° C. increments. (The sample was held at the desired temperature for one minute before recording data.) A sinusoidal torque with a frequency of 10 radians/second was applied to the lower grip which in turn applied a strain to the sample. The resultant stress was monitored by the upper grip and was recorded every 5 minutes. The recorded data were used to calculate both storage modulus (G') and loss modulus (G''), the peak of the loss modulus plot being taken as the glass transition temperature. Data are reported to the nearest whole number.

Tensile Modulus

Tensile modulus of the cured brick was measured according to ASTM test method D638-89. Data are reported to the nearest whole number.

Moisture Absorption

While not specifically measured, moisture absorption of the cured brick can also be used to characterize the compatibility of a binder resin/matrix resin blend. Moisture absorption is measured by placing a cured sample in an 88° C./100% relative humidity environment until equilibrium is reached. The moisture absorption is calculated as the increase in weight, expressed as a percentage of the initial weight.

TABLE 2

| Ex. | Parts of Matrix Resin | Parts of Binder Resin | Tg (°C.) | Tensile Modulus (MPa) |
|---|---|---|---|---|
| 2 | 100 | 0 | 201 | 3617 |
| 3 | 95 | 5 | 201 | NT |
| 4 | 90 | 10 | 201 | NT |
| 5 | 85 | 15 | 201 | NT |
| 6 | 0 | 100 | 201 | 3582 |

NT = Not Tested

The data of Table 2 demonstrate the excellent compatibility of the binder resins of the invention with an appropriate matrix resin. A lack of compatibility between the binder resin and the matrix resin can adversely affect the mechanical properties of the ultimate composite article. For example, the glass transition temperature may be reduced or broadened. Because of the excellent compatibility of the binder resin and the matrix resin, there is no need to apply the binder resin to the fabric plies of a preform in a substantially even manner or in a precise amount. Furthermore, migration of the binder during subsequent injection of the matrix resin (which could otherwise cause an uneven distribution of the binder resin in the ultimate composite article with a consequent loss of mechanical properties) is of minimal concern.

EXAMPLES 7 AND 8

Four composite articles were prepared, two for each example. Example 7 used preforms that had 16 plies of fabric for a compression stregth test and 8 plies of fabric for an in plane shear strength test (described below). The fabric plies were adhered together by the powdered binder resin of example 1. More specifically, 4% by weight of the powdered binder resin was sprinkled onto plain weave AS4 carbon fabric using a salt shaker. The fabric was heated under infrared lamps for about 1 minute. The temperature at the fabric surface, as measured by a thermocouple, was about 99° C. The powdered binder resin melted and then fused to the surface of the fabric upon subsequent cooling.

Example 8 comprised 16 plies of the same carbon fabric for the compression strength test and 8 plies of the same fabric for the in plane shear strength test. The fabric plies were not stabilized by a binder resin of the invention or by any other means (i.e., the fabric plies were stacked loosely on top of each other).

The preforms were used to prepare composite articles by resin transfer molding. Each preform was placed in a flat, two-part, mold. The mold was mounted in a hydraulic press that applied 160 kPa of pressure and that was heated to about 160° C. The mold cavity measured about 18 cm by 25 cm by 1.5 mm. The entrance port of the mold was closed and a vacuum was applied to the exit port. The entrance port was then opened and 860 kPa of injection pump pressure was applied. Matrix resin was injected into the mold cavity at 160° C. until the air had been flushed from the mold and the exiting resin stream was free of air bubbles, thereby impregnating the preform. The exit port was then closed, the vacuum source removed, and the mold pressurized with the injection pump at a pressure of about 700 kPa. The exit port was then opened and the exiting resin stream was observed for the presence of air bubbles. This process was repeated until the exiting resin stream was free of air bubbles. The exit valve was closed under an injection pump pressure of about 700 kPa, and the press temperature was increased to 177° C. and maintained for two hours. The mold was then allowed to cool in the press to room temperature. The matrix resin used in each example was 3M brand PR500 epoxy resin, commercially available from the 3M Company, and handled and processed according to the manufacturer's recommended procedures.

The resulting composite articles were then evaluated for their glass transition temperature (using the procedure described in conjunction with examples 2 to 6), compression strength (using the procedure of SACMA test method SRM-1-88), and in plane shear strength (using the procedure of SACMA test method SRM-7-88). SACMA refers to the Suppliers of Advanced Composite Manufacturer's Association. Data were recorded in pounds per square inch and mathematically converted to megaPascals. Data, reported to the nearest whole number, are shown below in Table 3.

TABLE 3

| Example | Tg (°C.) | Compression Strength (MPa) | In Plane Shear Strength (MPa) |
|---|---|---|---|
| 7 | 205 | 799 | 138 |
| 8 | 202 | 813 | 130 |

The data of Table 3 indicate that the mechanical and physical properties of examples 7 and 8 are virtually the same thereby demonstrating the excellent compatibility of the binder resin and the matrix resin.

Numerous variations and modifications are possible within the scope of the foregoing specification without departing from the spirit of the invention which is defined in the accompanying claims.

The embodiments for which an exclusive property or privilege is claimed are defined as follows:

1. A resin transfer molding preform binder resin comprising:
   a) at least one aromatic polyepoxide;
   b) a fluorene epoxide different than the aromatic epoxide and having the following structure:

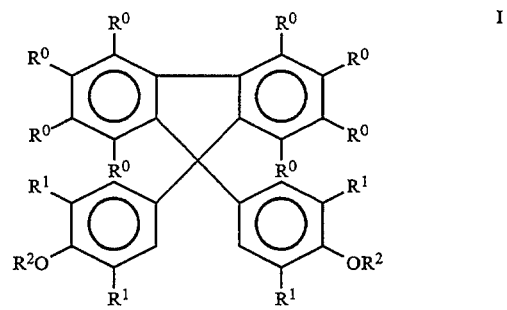

wherein each $R^0$ is independently selected from the group consisting of hydrogen, halogen, linear and branched alkyl groups having 1 to 6 carbon atoms, aromatic groups, nitro groups, acetyl groups, and trimethylsilyl groups;
   each $R^1$ is independently selected from the group consisting of hydrogen, halogen, aromatic groups, and linear and branched alkyl groups having 1 to 6 carbon atoms; and
   each $R^2$ is independently a terminal epoxy functionalized alkyl group having 1 to 6 carbon atoms; and
   c) a 9,9-bis(aminophenyl)fluorene curing agent for crosslinking the polyepoxide and the fluorene epoxide;
wherein the binder resin is a solid, room temperature stable, essentially nonsintering powder, and further wherein the uncured binder resin displays a glass transition temperature greater than about 40° C.

2. A binder resin according to claim 1 wherein the aromatic polyepoxide is a polyglycidyl ether of a polyhydric phenol.

3. A binder resin according to claim 1 wherein the aromatic polyepoxide is a blend of a diglycidyl ether of bisphenol A and an epoxy cresol novolac.

4. A binder resin according to claim 3 wherein the diglycidyl ether of bisphenol A has an epoxide equivalent weight of about 500 to 750 and the epoxy cresol novolac has an epoxide equivalent weight of about 170 to 250.

5. A binder resin according to claim 4 wherein the diglycidyl ether of bisphenol A has an epoxide equivalent weight of about 525 to 550.

6. A binder resin according to claim 1 wherein the fluorene epoxide is a diglycidyl ether of a 9,9-bis(hydroxyphenyl)fluorene.

7. A binder resin according to claim 6 wherein the fluorene epoxide is 9,9-bis[4-(2,3-epoxypropoxy)phenyl]fluorene.

8. A binder resin according to claim 1 wherein the 9,9-bis(aminophenyl)fluorene curing agent has the general structure:

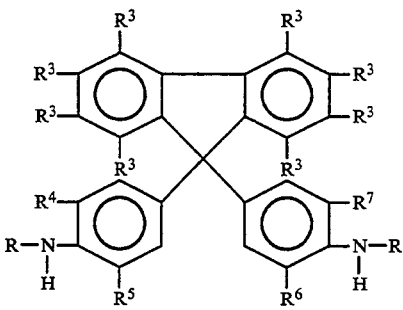

wherein:
each R is independently selected from the group consisting of hydrogen and linear and branched alkyl groups having 1 to 6 carbon atoms;
each $R^3$ is independently selected from the group consisting of hydrogen, halogen, aromatic groups, nitro groups, acetyl groups, trimethylsilyl groups, and linear and branched alkyl groups having 1 to 6 carbon atoms, and
each $R^4$, $R^5$, $R^6$ and $R^7$ is independently selected from the group consisting of hydrogen, halogen, aromatic groups, and linear and branched alkyl groups having 1 to 6 carbon atoms.

9. A binder resin according to claim 8 wherein at least 25 mole % of the R moieties are linear or branched alkyl groups having 1 to 6 carbon atoms.

10. A binder resin according to claim 8 wherein:
each R is a hydrogen;
at least one of the $R^4$ and $R^5$ moieties is a halogen, an aromatic group, or a linear or branched alkyl group having 1 to 6 carbon atoms; and
at least one of the $R^6$ and $R^7$ moieties is a halogen, an aromatic group, or a linear or branched alkyl group having 1 to 6 carbon atoms.

11. A binder resin according to claim 9 wherein:
the aromatic polyepoxide is a polyglycidyl ether of a polyhydric phenol; and
the fluorene epoxide is a diglycidyl ether of a 9,9-bis(hydroxyphenyl)fluorene;
the binder resin further comprising an optional second epoxy resin curing agent selected from the group consisting of aliphatic polyamines, aromatic polyamines, aromatic polyamides, alicyclic polyamines, and amino resins;
wherein the binder resin comprises from 0.5 to 1.1 —NHR groups, per epoxide group present in the aromatic polyepoxide and the fluorene epoxide, 20 to 100 mole % of the —NHR groups being provided by the 9,9-bis(aminophenyl)fluorene curing agent and 80 to 0 mole % of the —NHR groups being provided by the optional second epoxy resin curing agent.

12. A binder resin according to claim 10 wherein:
the aromatic polyepoxide is a polyglycidyl ether of a polyhydric phenol;
the fluorene epoxide is a diglycidyl ether of a 9,9-bis(hydroxyphenyl)fluorene; and
the 9,9-bis(aminophenyl)fluorene curing agent provides from 0.6 to 0.85 —$NH_2$ groups, per epoxide group provided by the aromatic polyepoxide and the fluorene epoxide.

13. A binder resin according to claim 1 wherein the uncured binder resin has a glass transition temperature greater than 55° C.

14. A binder resin according to claim 13 wherein the uncured binder resin has a glass transition temperature greater than 65° C.

15. A binder resin according to claim 1 that has not been advanced.

16. A binder resin according to claim 1 wherein the aromatic polyepoxide, the fluorene epoxide, and the 9,9-bis(aminophenyl) fluorene curing agent have been melt blended.

* * * * *

UNITED STATES PATENT AND TRADEMARK OFFICE
CERTIFICATE OF CORRECTION

PATENT NO.: 5,369,192

DATED: November 29, 1994

INVENTOR(S): Chan U. Ko and Steven C. Hackett

It is certified that error appears in the above-identified patent and that said Letters Patent is hereby corrected as shown below:

Col. 7, line 16, "Each R and R1 is independently" should read --Each $R^0$ and $R^1$ is independently--.

Col. 7, line 18, "R is preferably independently" should read --$R^0$ is preferably independently--.

Col. 7, line 36, "no requirement that each R be the same" should read --no requirement that each $R^0$ be the same--.

Signed and Sealed this

Second Day of July, 1996

Attest:

Attesting Officer

BRUCE LEHMAN

Commissioner of Patents and Trademarks